United States Patent
Yeh

(10) Patent No.: US 11,087,481 B2
(45) Date of Patent: Aug. 10, 2021

(54) METHOD FOR DETECTING DIMENSION OF BOX BASED ON DEPTH MAP

(71) Applicant: HIMAX TECHNOLOGIES LIMITED, Tainan (TW)

(72) Inventor: Ying-Han Yeh, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 46 days.

(21) Appl. No.: 16/737,882

(22) Filed: Jan. 8, 2020

(65) Prior Publication Data

US 2021/0209779 A1    Jul. 8, 2021

(51) Int. Cl.
*G06T 7/00* (2017.01)
*G06T 5/00* (2006.01)
*G06T 7/543* (2017.01)
*G06T 7/13* (2017.01)
*G06T 5/10* (2006.01)

(52) U.S. Cl.
CPC .............. *G06T 7/543* (2017.01); *G06T 5/002* (2013.01); *G06T 5/10* (2013.01); *G06T 7/13* (2017.01); *G06T 2207/10012* (2013.01); *G06T 2207/10028* (2013.01)

(58) Field of Classification Search
CPC .......... G06T 7/543; G06T 7/13; G06T 5/002; G06T 5/10; G06T 2207/10012; G06T 2207/10028

See application file for complete search history.

(56) References Cited

U.S. PATENT DOCUMENTS

| | | | | |
|---|---|---|---|---|
| 6,995,762 B1 * | 2/2006 | Pavlidis | ................ | G06T 7/50 345/419 |
| 10,089,750 B2 * | 10/2018 | Ho | ..................... | G06T 7/521 |
| 10,769,806 B2 * | 9/2020 | Driegen | .................. | G06T 7/62 |
| 2014/0379613 A1 * | 12/2014 | Nishitani | ............... | G06T 7/60 705/400 |
| 2015/0187091 A1 * | 7/2015 | Hata | ..................... | G01C 3/14 382/101 |
| 2019/0279022 A1 * | 9/2019 | Chiu | ..................... | G06K 9/4642 |
| 2020/0167943 A1 * | 5/2020 | Kim | ..................... | G06K 9/6267 |

* cited by examiner

*Primary Examiner* — Chan S Park
*Assistant Examiner* — Claude Noel Y Zanetsie
(74) *Attorney, Agent, or Firm* — CKC & Partners Co., LLC

(57) ABSTRACT

A method for detecting dimension of box based on depth map includes: receiving a depth map generated by a camera, the depth map corresponds to pixels of an image including a box; performing a coordinate transformation to transform the depth map into camera coordinates of each of the pixels; dividing some of the pixels into plural blocks, each of blocks includes a number of the pixels adjacent to each other; statistically analyzing an average normal vector of each of the blocks according to the camera coordinates of the pixels of each of the blocks; classifying the blocks into plural clusters according to the average normal vector of each of the blocks; performing a plane extraction to obtain edge vectors according to plane formulas of the clusters; obtaining vertexes of the box according to the edge vectors; and obtaining a dimension of the box according the vertexes.

10 Claims, 6 Drawing Sheets

METHOD FOR DETECTING DIMENSION OF BOX BASED ON DEPTH MAP

BACKGROUND

Field of Invention

The present invention relates to a method for detecting a dimension of a box. More particularly, the present invention relates to a method for detecting the dimension of the box based on a depth map.

Description of Related Art

In several applications of some industries, a dimension of a box needs to be detected because the dimension of the box can be helpful in many aspects. One of the conventional methods for detecting the dimension of the box is to analyze a depth map captured by a depth camera. However, the depth map might not be precise enough to determine the dimension of the box.

SUMMARY

The present invention provides a method for detecting a dimension of a box based on a depth map. The method includes: receiving the depth map generated by a camera, in which the depth map corresponds to pixels of an image including the box; performing a coordinate transformation to transform the depth map into camera coordinates of each of the pixels; dividing some of the pixels into plural blocks, in which each of blocks includes a number of the pixels adjacent to each other; statistically analyzing an average normal vector of each of the blocks according to the camera coordinates of the pixels of each of the blocks; classifying the blocks into plural clusters according to the average normal vector of each of the blocks; performing a plane extraction to obtain edge vectors according to plane formulas of the clusters; obtaining vertexes of the box according to the edge vectors; and obtaining the dimension of the box according the vertexes.

In accordance with one or more embodiments of the invention, the method further includes: performing a noise removal process on the depth map before performing the coordinate transformation.

In accordance with one or more embodiments of the invention, the coordinate transformation is performed by using intrinsic parameters built in the camera.

In accordance with one or more embodiments of the invention, each of some of the pixels to be divided is the pixel with valid depth value.

In accordance with one or more embodiments of the invention, the average normal vector of one of the blocks is an average of normal vectors of plural defined planes, in which each of the defined planes is composed by three of the pixels of the one of the blocks.

In accordance with one or more embodiments of the invention, the method further includes: performing a block outlier removal on the blocks before performing the plane extraction, in which the block outlier removal is configured to remove the blocks located nearby edges of the box.

In accordance with one or more embodiments of the invention, the plane extraction is performed to obtain at least three surfaces of the box, in which the edge vectors are computed by the obtained surfaces.

In accordance with one or more embodiments of the invention, the vertexes include a first vertex, a second vertex, a third vertex, and a fourth vertex. The second vertex is the vertex closest to the camera.

In accordance with one or more embodiments of the invention, the second vertex is obtained by computing an intersection point of the edge vectors.

In accordance with one or more embodiments of the invention, one of the first vertex, the third vertex, and the fourth vertex is obtained by, starting from the second vertex toward along one of edges of the box, scanning a shortest distance between the pixels and the one of the edges of the box.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
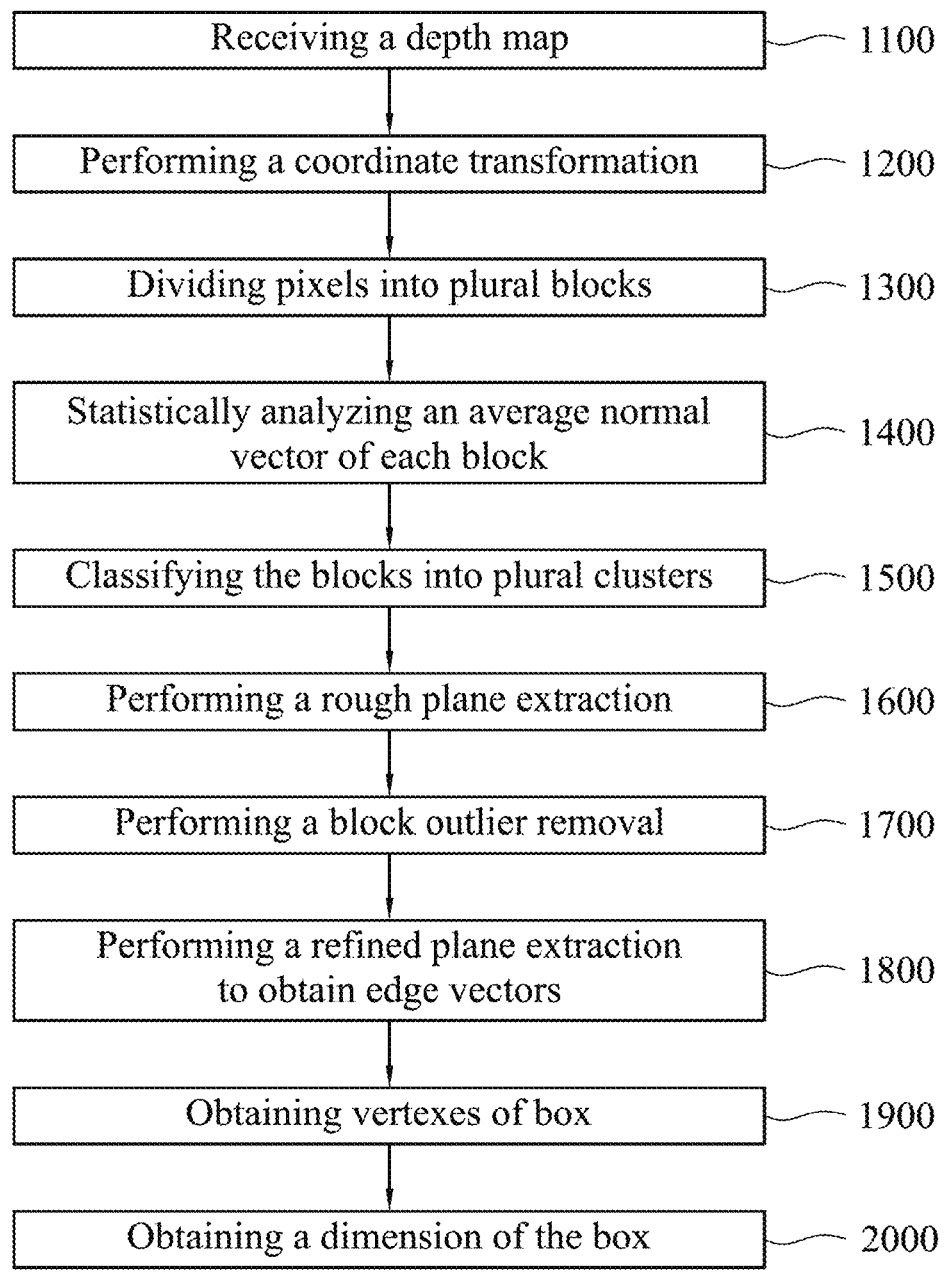
FIG. 1 illustrates a flow chart of a method for detecting a dimension of a box based on a depth map according to some embodiment of the present invention.

FIG. 1 illustrates a flow chart of a method 1000 for detecting a dimension of a box based on a depth map according to some embodiment of the present invention. FIGS. 2A-2G are drawings to respectively illustrate several steps of the method 1000 according to some embodiment of the present invention. The method 1000 includes steps 1100-1900 and 2000. In step 1100, a depth map generated by a camera (e.g., a depth camera) is received, in which the depth map corresponds to pixels of an image including a box to be detected. The depth map described in the step 1100 is exemplarily shown in FIG. 2A.

The depth map includes pixels that represent distance from a reference point (e.g., a depth sensor of the camera) to a portion of the box corresponding to the pixel. The distance from the reference point to the portion of the box is also referred to as depth value or depth information herein. The depth map may be obtained by the camera using time-of-flight sensing, stereoscopic image matching, and/or structured light sensing techniques, but the present invention is not limited thereto.

In some embodiment of the present invention, a noise removal process is further performed on the depth map after performing the step 1100. The noise removal process is configured to remove the interferences of the depth map, for example, caused by small dust particles, thereby improving the detecting efficiency of the method 1000 of the present invention.

In step 1200, a coordinate transformation is performed to transform the depth map into camera coordinates of each of the pixels. In some embodiment of the present invention, the coordinate transformation is performed by, for example, using intrinsic parameters built in the camera. Specifically, the camera coordinates of one of the pixels correspond to the three-dimensional coordinates of the one of the pixels with respect to the camera. The result of the step 1200 is exemplarily shown in FIG. 2B.

In step 1300, some of the pixels are divided into plural blocks, in which each of blocks includes a number of the pixels adjacent to each other. For example, each of blocks includes 10×10 pixels adjacent to each other. In some embodiment of the present invention, each of some of the pixels to be divided is the pixel with valid depth value. Specifically, before performing the step 1300, a pixel outlier removal on the pixels is performed so as to remove the pixels each with invalid depth value and/or extreme value, thereby improving the detecting efficiency of the method 1000.

In step 1400, an average normal vector of each of the blocks is statistically analyzed according to the camera coordinates of the pixels of each of the blocks. In some embodiment of the present invention, the average normal vector of one of the blocks is an average of plural normal vectors of plural defined planes, in which each of the defined planes is composed by any three non-collinear pixels of the one of the blocks. Specifically, three non-collinear pixels could compose one plane, and therefore plural sets of three non-collinear pixels could be selected to compute the normal vectors of the composed planes corresponding to the selected sets. The result of the step 1400 is exemplarily shown in FIG. 2C.

Figure 2A:
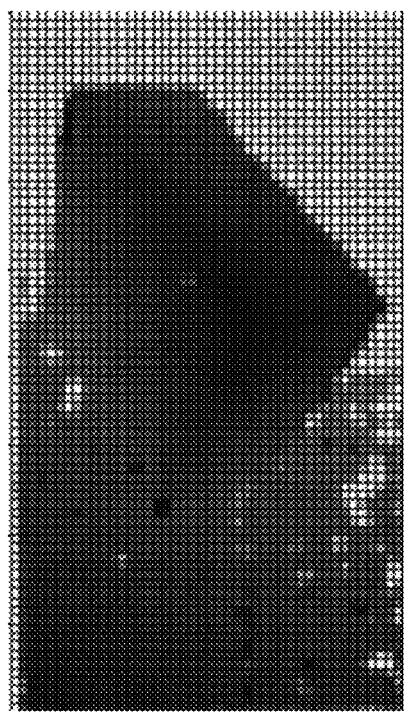
FIGS. 2A-2G are drawings to respectively illustrate several steps of the method according to some embodiment of the present invention.
Figure 2B:
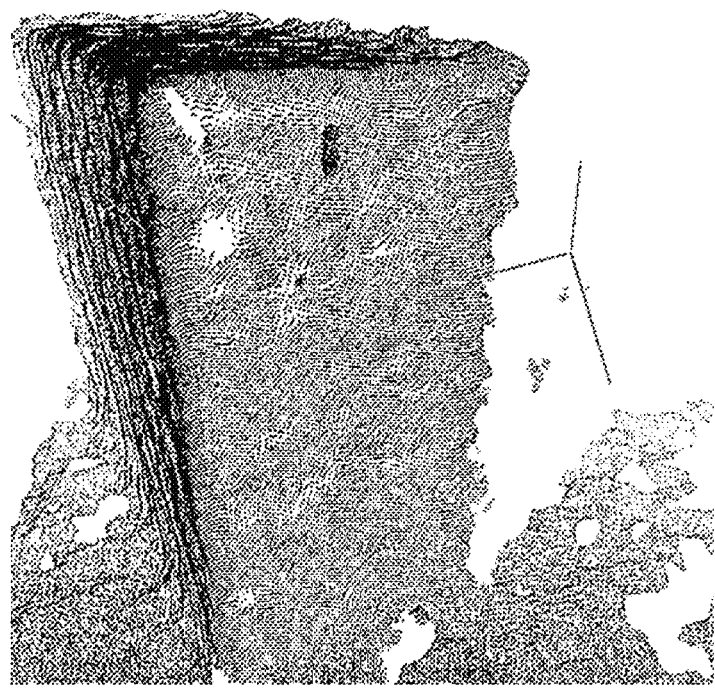
Figure 2C:
Figure 2D:
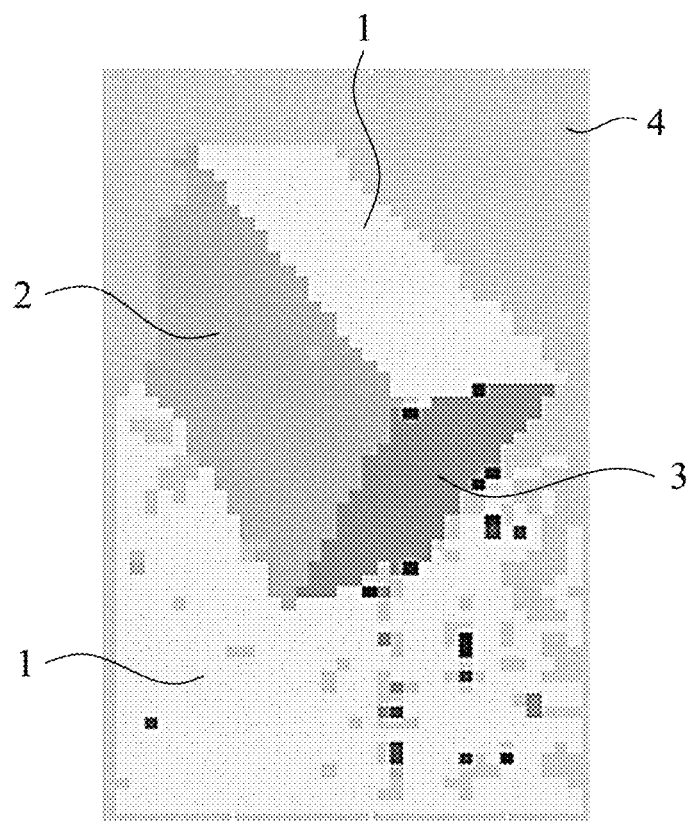
Figure 2E:
Figure 2F:
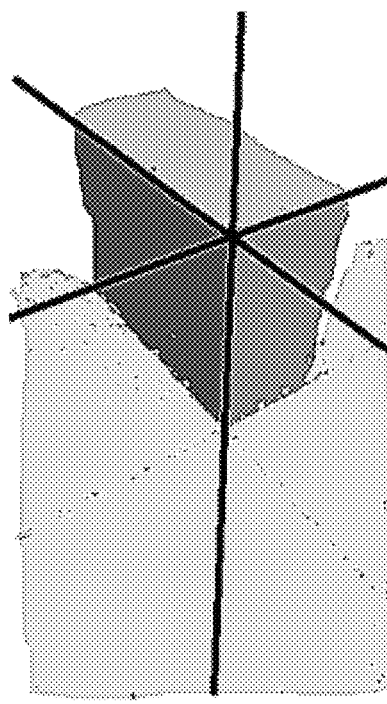
Figure 2G:
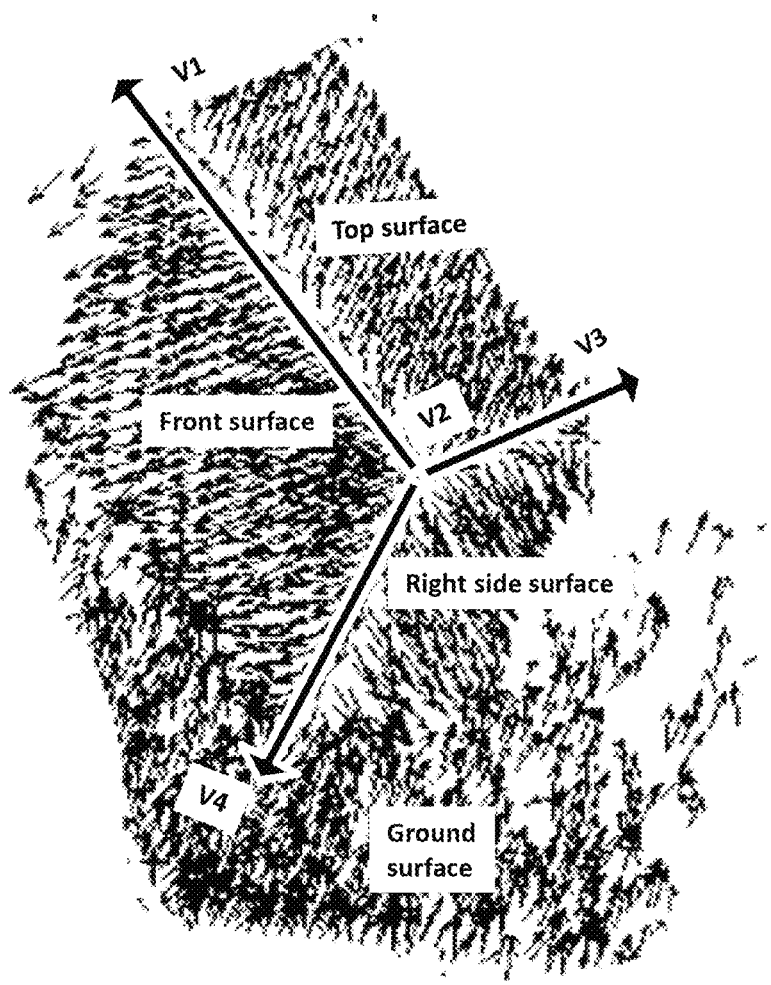

In step 1500, the blocks are classified into plural clusters according to the average normal vector of each of the blocks. In some embodiment of the present invention, each of the clusters includes the blocks with similar average normal vector. The result of the step 1500 is exemplarily shown in FIG. 2D, as shown in FIG. 2D, the blocks are classified into four clusters.

In step 1600, a rough plane extraction is performed to estimate the plane formulas of the surfaces corresponding to the clusters, in which the estimated surfaces include three surfaces of the detected box (i.e., a top surface, a front surface, and a right side surface of the detected box), or the estimated surfaces include three surfaces of the detected box and a ground surface with the detected box disposed thereon. In some embodiment of the present invention, the plane formula of one of the surfaces is computed according to the average normal vectors of the blocks of the corresponding cluster and the camera coordinates of the pixels of each of the blocks of the corresponding cluster. It is worth mentioning that the plane formula of the top surface of the detected box and the plane formula of the ground surface with the detected box disposed thereon could be differentiated because the top surface and the ground surface have different intercepts.

In step 1700, a block outlier removal is performed on the blocks so as to remove the blocks located nearby edges of the box. Specifically, the average normal vectors of the blocks located nearby edges of the box would be extreme value. Therefore, the block outlier removal is performed on the blocks located nearby edges of the box, thereby improving the detecting efficiency of the method 1000. The result of the step 1700 is exemplarily shown in FIG. 2E.

In step 1800, a refined plane extraction is performed to compute the plane formulas of three surfaces of the detected box or to compute the plane formulas of three surfaces of the detected box and the ground surface. In some embodiment of the present invention, plural edge vectors are accordingly obtained in the step 1800 according to the computed plane formulas of the said surfaces. Specifically, each of three edge vectors obtained in the step 1800 is corresponds to an intersecting edge/boundary between two of the three surfaces of the detected box. The result of the step 1800 is exemplarily shown in FIG. 2F.

In step 1900, plural vertexes of the box are obtained according to the edge vectors. The result of the step 1900 is exemplarily shown in FIG. 2G. In some embodiment of the present invention, the vertexes include a first vertex V1, a second vertex V2, a third vertex V3, and a fourth vertex V4. Specifically, the edge vectors obtained in the step 1800 include a vector represented a direction from the second vertex V2 to the first vertex V1, a vector represented a direction from the second vertex V2 to the third vertex V3, and a vector represented a direction from the second vertex V2 to the fourth vertex V4.

The second vertex V2 is the vertex closest to the camera. Specifically, the second vertex V2 is obtained by computing an intersection point of the edge vectors. The fourth vertex V4 may be obtained by computing an intersection point of the front surface of the detected box, the right side surface of the detected box, and the ground surface with the detected box disposed thereon.

Figure 3C:
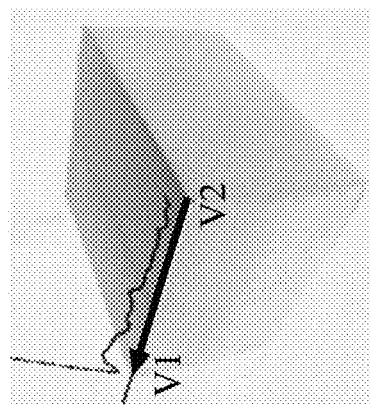
FIGS. 3A-3C are drawings used to explain how to determine some vertexes of the box according to some embodiment of the present invention.
Figure 3B:
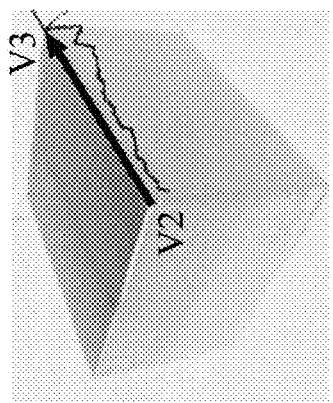
Figure 3A:
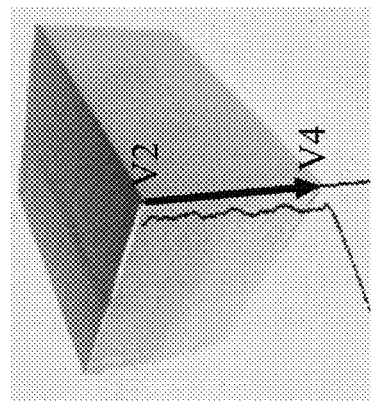

Moreover, as shown in FIGS. 3A-3C, one of the first vertex V1, the third vertex V3, and the fourth vertex V4 is obtained by, starting from the second vertex V2 toward along the corresponding edge vector, scanning a shortest distance between the pixels and the corresponding edge of the box. For example, the first vertex V1 is obtained by, starting from the second vertex V2 toward along the edge vector represented the direction from the second vertex V2 to the first vertex V1, scanning a shortest distance between the pixels and the edge between the top surface and the front surface of the box. Further, as shown in FIGS. 3A-3C, when the scanned shortest distance is increased greatly, it should be understood that the point corresponding to the increased greatly shortest distance is the obtained vertex (one of the first vertex V1, the third vertex V3, and the fourth vertex V4).

In step 2000, a dimension of the box is obtained according the vertexes. Specifically, a length of the box is a distance from the second vertex V2 to the first vertex V1, a width of the box is a distance from the second vertex V2 to the third vertex V3, and a height of the box is a distance from the second vertex V2 to the fourth vertex V4.

From the above description, the method for detecting the dimension of the box based on the depth map is disclosed. As can be seen, by using the method of the present invention, the dimension of the box can be determined more accurately and robustly.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for detecting dimension of box based on depth map, comprising:
   receiving a depth map generated by a camera, wherein the depth map corresponds to pixels of an image including a box;
   performing a coordinate transformation to transform the depth map into camera coordinates of each of the pixels;
   dividing some of the pixels into plural blocks, wherein each of blocks comprises a number of the pixels adjacent to each other;
   statistically analyzing an average normal vector of each of the blocks according to the camera coordinates of the pixels of each of the blocks;
   classifying the blocks into plural clusters according to the average normal vector of each of the blocks;
   performing a plane extraction to obtain edge vectors according to plane formulas of the clusters;
   obtaining vertexes of the box according to the edge vectors; and
   obtaining a dimension of the box according the vertexes.

2. The method of claim 1, further comprising:
   performing a noise removal process on the depth map before performing the coordinate transformation.

3. The method of claim 1, wherein the coordinate transformation is performed by using intrinsic parameters built in the camera.

4. The method of claim 1, wherein each of some of the pixels to be divided is the pixel with valid depth value.

5. The method of claim 1, wherein the average normal vector of one of the blocks is an average of normal vectors of plural defined planes, wherein each of the defined planes is composed by three of the pixels of the one of the blocks.

6. The method of claim 1, further comprising:
   performing a block outlier removal on the blocks before performing the plane extraction, wherein the block outlier removal is configured to remove the blocks located nearby edges of the box.

7. The method of claim 1, wherein the plane extraction is performed to obtain at least three surfaces of the box, wherein the edge vectors are computed by the obtained surfaces.

8. The method of claim 1,
   wherein the vertexes comprise a first vertex, a second vertex, a third vertex, and a fourth vertex;
   wherein the second vertex is the vertex closest to the camera.

9. The method of claim 8, wherein the second vertex is obtained by computing an intersection point of the edge vectors.

10. The method of claim 8, wherein one of the first vertex, the third vertex, and the fourth vertex is obtained by, starting from the second vertex toward along one of edges of the box, scanning a shortest distance between the pixels and the one of the edges of the box.

* * * * *